US012225384B2

(12) United States Patent
Buyukdura

(10) Patent No.: US 12,225,384 B2
(45) Date of Patent: *Feb. 11, 2025

(54) 5G NETWORK SLICE PRE-CONFIGURATION

(71) Applicant: AT&T Intellectual Property I, L.P., Atlanta, GA (US)

(72) Inventor: Feza Buyukdura, Fairview, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/435,723

(22) Filed: Feb. 7, 2024

(65) Prior Publication Data

US 2024/0214822 A1    Jun. 27, 2024

Related U.S. Application Data

(63) Continuation of application No. 18/296,827, filed on Apr. 6, 2023, now Pat. No. 11,930,369, which is a
(Continued)

(51) Int. Cl.
*H04W 16/02* (2009.01)
*H04L 41/0893* (2022.01)
*H04L 67/10* (2022.01)

(52) U.S. Cl.
CPC ......... *H04W 16/02* (2013.01); *H04L 41/0893* (2013.01); *H04L 67/10* (2013.01)

(58) Field of Classification Search
CPC ..... H04W 16/02; H04L 41/0893; H04L 67/10
See application file for complete search history.

(56) References Cited

U.S. PATENT DOCUMENTS

| 2020/0187106 A1* | 6/2020 | Salkintzis | ............... H04W 4/60 |
| 2021/0083933 A1* | 3/2021 | Bull | ........................ H04L 47/24 |
| 2021/0112565 A1* | 4/2021 | Bhaskaran | ............... H04W 8/18 |

FOREIGN PATENT DOCUMENTS

| WO | 2017032280 A1 | 3/2017 |
| WO | 2017143047 A1 | 8/2017 |

OTHER PUBLICATIONS

Final Office Action received for U.S. Appl. No. 16/901,235, Jan. 6, 2022, 130 pgs.
(Continued)

*Primary Examiner* — Hermon Asres
(74) *Attorney, Agent, or Firm* — Guntin & Gust, PLC; Atanu Das

(57) ABSTRACT

The described technology is generally directed towards network slice pre-configuration for cellular communication systems, including 5G and subsequent generation cellular communication systems. Network equipment can be pre-configured to identify whether a network slice identifier included in a network communication belongs to a group of network slice identifiers. If so, the network equipment can process the network communication either according to a network slice rule that corresponds specifically to the network slice identifier, or according to a default group network slice rule for the group to which the network slice identifier belongs. Different groups of network slice identifiers can be associated with different sets of group network slice rules which can be arranged to reduce the work of setting up network slice identifiers in various network slicing scenarios.

20 Claims, 9 Drawing Sheets

Related U.S. Application Data continuation of application No. 17/814,134, filed on Jul. 21, 2022, now Pat. No. 11,653,212, which is a continuation of application No. 16/901,235, filed on Jun. 15, 2020, now Pat. No. 11,432,159.

(56) References Cited

OTHER PUBLICATIONS

Notice of Allowance received for U.S. Appl. No. 17/814,134, Jan. 10, 2023, 55 pgs.
Non-Final Office Action received for U.S. Appl. No. 16/901,235, Jul. 8, 2021, 76 pgs.
Notice of Allowance received for U.S. Appl. No. 16/901,235, Apr. 22, 2022, 32 pgs.

* cited by examiner

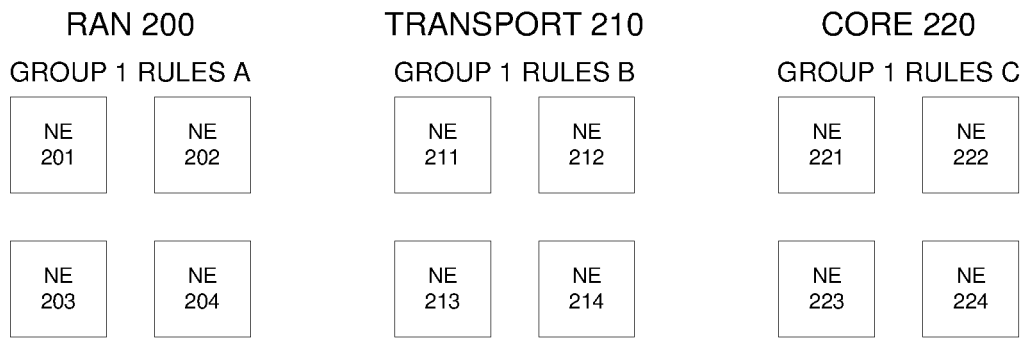
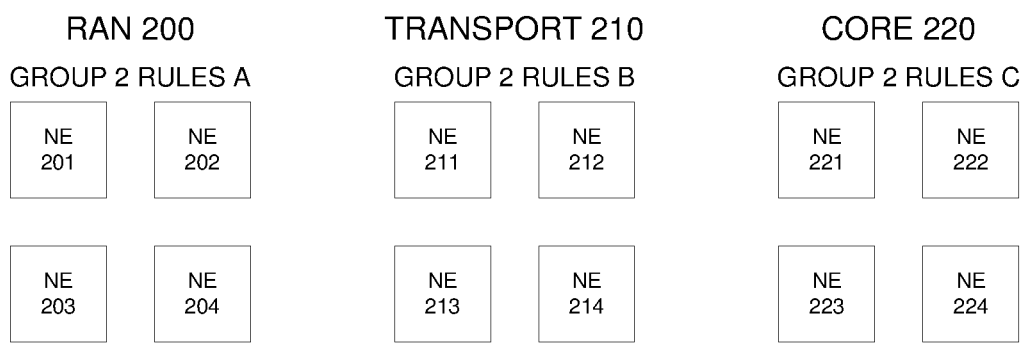
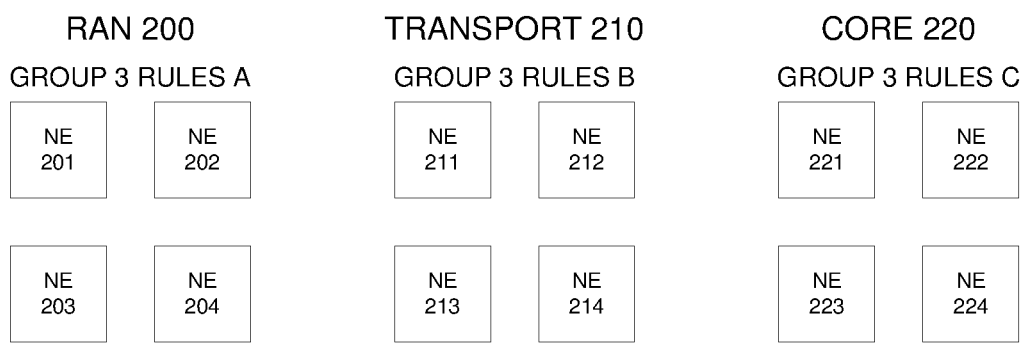
FIG. 2

| Slice ID | | | Purpose |
|---|---|---|---|
| SST | SD | | SST = slice Type; SD = Slice Differentiator |
| 1 | null | | EMBB default Slice. Assign in RAN and Core as the wild card *.* default behavior configuration. |
| 2 | null | | URLLC default Slice. No pre-configuration in the network is needed, until it is needed. |
| 3 | null | | MIoT default Slice. No pre-configuration in the network is needed, until it is needed. |
| 4 | null | | V2X default Slice. No pre-configuration in the network is needed, until it is needed. |
| | | | |
| 128 | 1-10,000 | | Pre-configured for enterprises that slice level impact is limited to core policy rules. |
| | | | No RAN or NSSF, AMF or NRF configuration is needed; only range based pre-configured to behavior treatment. |
| 128 | 10,001 – 20,000 | | Pre-configured for enterprises that have dedicated core network per slice ID. No RAN configuration needed by default. |
| | | | If it requires RAN treatment differentiation, individual entry or sub-ranges will be used at more specific match rule. |
| 128 | 20,001 – 30,000 | | Pre-configured for RAN resource segmentation in certain locations (e.g., factories, Venues). No Core configuration is required by default. Note 1. |
| 128 | 30,001 – 40,000 | | Pre-configured for RAN custom QoS characteristics per slice ID. No Core configuration is required by default. |
| | | | |
| 129 | * | | Dedicated network 1. Further sub ranges will be defined based on their needs. TBD. |
| 130 | * | | Dedicated network 2. Fixed Wireless. Further sub ranges will be defined based on their needs. TBD. |

FIG. 5

5G NETWORK SLICE PRE-CONFIGURATION

RELATED APPLICATIONS

The subject patent application is a continuation of, and claims priority to each of, U.S. patent application Ser. No. 18/296,827, filed Apr. 6, 2023, and entitled "5G NETWORK SLICE PRE-CONFIGURATION," which is a continuation U.S. patent application Ser. No. 17/814,134 (now U.S. Pat. No. 11,653,212), filed Jul. 21, 2022, and entitled "5G NETWORK SLICE PRE-CONFIGURATION," which is a continuation of U.S. patent application Ser. No. 16/901,235 (now U.S. Pat. No. 11,432,159), filed Jun. 15, 2020, and entitled "5G NETWORK SLICE PRE-CONFIGURATION." All sections of the aforementioned application(s) and/or patent(s) are incorporated herein by reference in their entirety.

TECHNICAL FIELD

The subject application is related to fifth generation (5G) and subsequent generation cellular communication systems.

BACKGROUND

The rise of massive scale connected devices via the internet leads to diversified wireless communication service requirements, with different user equipment (UE) devices and applications having different communication needs. For example, internet-of-things (IoT) devices, mobile phones, surveillance cameras, autonomous guided vehicles and low-latency applications such as augmented reality (AR) and virtual reality (VR) devices all have unique communication service requirements. Therefore, wireless communication service providers, such as AT&T Corporation and others, will increasingly need to deploy their communication services flexibly to accommodate such diversified service requirements.

The emerging Third Generation Partnership Project (3GPP) New Radio (NR) fifth generation (5G) mobile communication standard includes support for network slicing. Network slicing provides at least a partial solution to support diversified wireless communication service requirements. However, network slicing technologies are still not fully developed. For example, wireless communication networks are typically divided into different sub-networks, including an access network, a transport network, and a core network. Configuring all of the network elements of these different sub-networks to correctly process different network slices can be complex and time consuming.

The above-described background is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 2 illustrates example network equipment which is preconfigured to use different default network slice rules with different groups of network slice identifiers, in accordance with various aspects and embodiments of the subject disclosure.

FIG. 5 illustrates an example of a network slice identifier pre-configuration number plan, in accordance with various aspects and embodiments of the subject disclosure.

DETAILED DESCRIPTION

Figure 1:
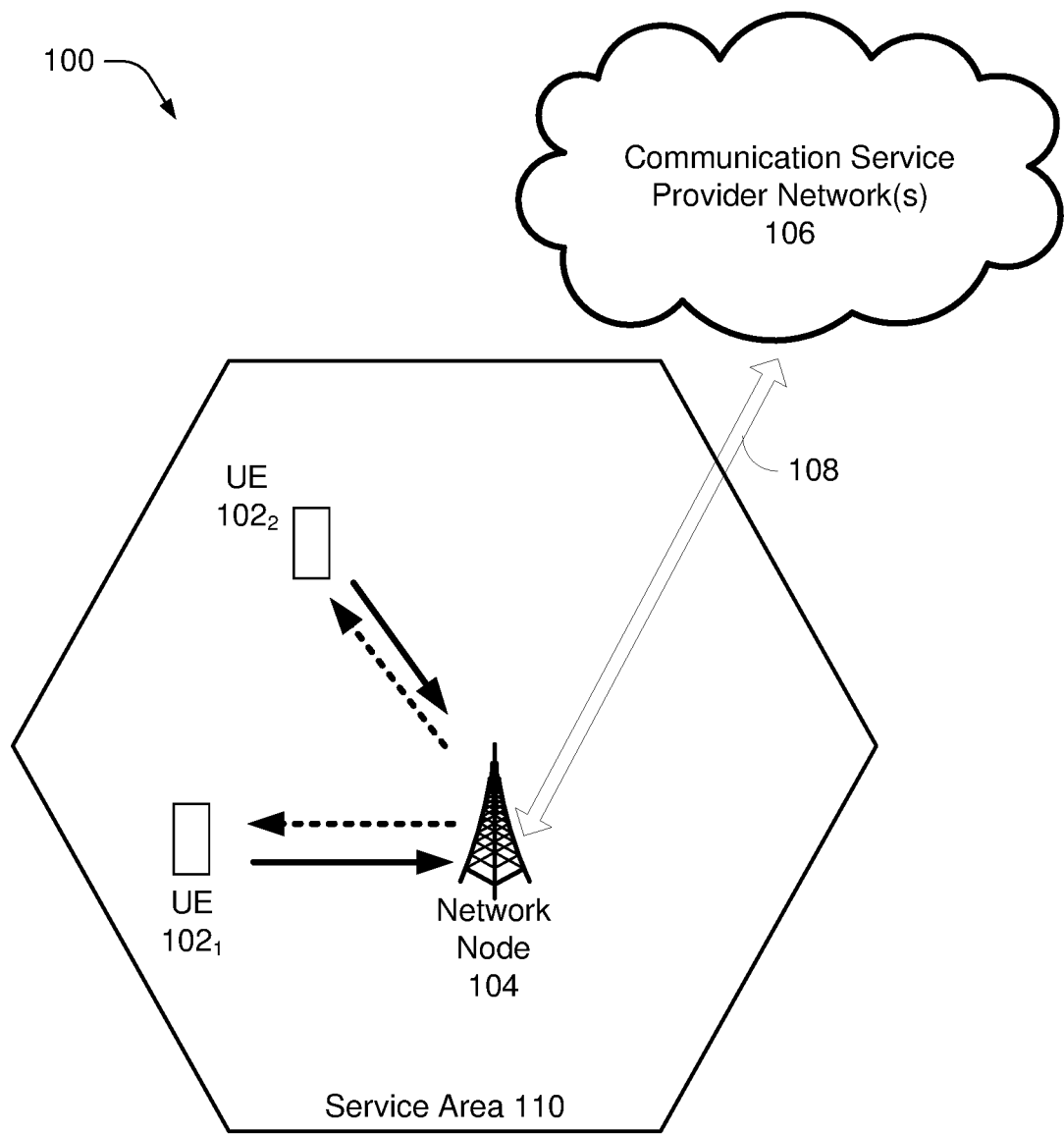
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards network slice pre-configuration for cellular communication systems. The disclosed techniques can be employed in systems that implement network slicing, namely, 5G and subsequent generation cellular communication systems. When processing a network communication that includes a network slice identifier, network equipment can be preconfigured to identify whether the network slice identifier belongs to a group of network slice identifiers. If so, the network equipment can process the network communication either according to a network slice rule that corresponds specifically to the network slice identifier, or according to a default group network slice rule for the group to which the network slice identifier belongs. Different groups of network slice identifiers can be associated with different group network slice rules, which can be arranged to reduce the work of setting up network slice identifiers in various network slicing scenarios.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3× (5G Option 3×), high speed packet access (HSPA), Z-Wave, Zigbee and other 802.XX wireless technologies and/or legacy telecommunication technologies.

FIG. 1 illustrates a non-limiting example of a wireless communication system 100 which can be used in connection with at least some embodiments of the subject disclosure. In one or more embodiments, system 100 can comprise one or more user equipment UEs $102_1$, $102_2$, referred to collectively as UEs 102, a network node 104 that supports cellular communications in a service area 110, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 102 can also comprise IOT devices that communicate wirelessly.

In various embodiments, system 100 comprises communication service provider network(s) 106 serviced by one or more wireless communication network providers. Communication service provider network(s) 106 can comprise a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop MIMO mode and/or a rank-1 precoder mode.

A network node 104 can have a cabinet and other protected enclosures, computing devices, an antenna mast, and multiple antennas for performing various transmission operations (e.g., MIMO operations) and for directing/steering signal beams. Network node 104 can comprise one or more base station devices which implement features of the network node 104. Network nodes can serve several cells, also called sectors, depending on the configuration and type of antenna. In example embodiments, UEs 102 can send and/or receive communication data via a wireless link to the network node 104. The dashed arrow lines from the network node 104 to the UEs 102 represent downlink (DL) communications and the solid arrow lines from the UEs 102 to the network node 104 represents an uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can comprise various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or comprise a large scale wireless communication network that spans various geographic areas. According to this implementation, the one or more communication service provider networks 106 can be or comprise the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can comprise terrestrial air-interfaces or deep space links (e.g., satellite communication links for navigation). Backhaul links 108 can be implemented via a "transport network" in some embodiments. In another embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g., LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

Figure 3:
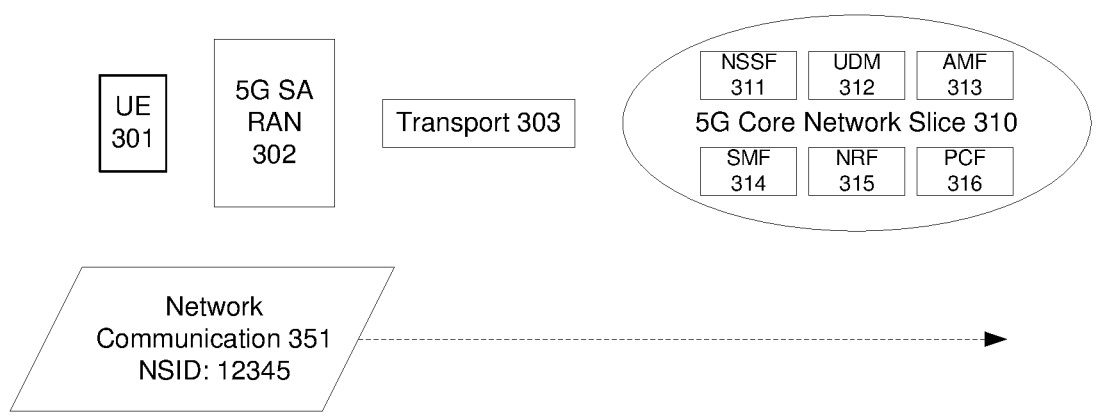
FIG. 3 illustrates various example network equipment of a cellular communications network that can be configured to process network communications comprising network slice IDs, in accordance with various aspects and embodiments of the subject disclosure.

FIG. 2 illustrates example network equipment which is preconfigured to use different default network slice rules with different groups of network slice identifiers, in accordance with various aspects and embodiments of the subject disclosure. A cellular communication system can include different sub-networks such as RAN 200, transport 210, and core 220. Each of these sub-networks can include various network equipment (NE), for example, RAN 200 can include NE 201, NE 202, NE 203, and NE 204. Transport 210 can include NE 211, NE 212, NE 213, and NE 214. Core 220 can include NE 221, NE 222, NE 223, and NE 224. FIG. 3 provides more detailed examples of different types of network equipment.

While in some cases network equipment can comprise, e.g., a physical device, in many cases network equipment can be implemented as a software element at a device, or at a group of devices, which potentially host multiple network equipment elements. For this reason, the term "network equipment" as used herein should be considered interchangeable with the term "network element".

FIG. 2 provides three views of the example NE components, with a first view showing example group network slice rules to process a first example group (Group 1) of network slice identifiers (network slice IDs), a second view showing example group network slice rules to process a second example group (Group 2) of network slice IDs, and a third view showing example group network slice rules to process a third example group (Group 3) of network slice IDs.

Groups of network slice IDs can be mathematically defined in many different ways, as will be appreciated. In the example provided by FIG. 2, the groups are defined by ranges of network slice IDs. Group 1 can include network slice IDs 1-10, Group 2 can include network slice IDs 11-20, and Group 3 can include network slice IDs 21-30.

When processing network communications comprising any of the network slice IDs of Group 1 (network slice IDs 1-10), the RAN 200 NEs 201, 202, 203, and 204 can be configured to apply Group 1 Rules A. Group 1 Rules A can comprise, e.g., rules to be applied by each of the NEs 201, 202, 203, and 204, optionally including different rules for use by the different NEs 201, 202, 203, and 204.

Similarly, when processing network communications comprising any of the network slice IDs of Group 1 (network slice IDs 1-10), the transport 210 NEs 211, 212, 213, and 214 can be configured to apply Group 1 Rules B. Group 1 Rules B can comprise, e.g., rules to be applied by each of the NEs 211, 212, 213, and 214, optionally including different rules for use by the different NEs 211, 212, 213, and 214.

Also similarly, when processing network communications comprising any of the network slice IDs of Group 1 (network slice IDs 1-10), the core 220 NEs 221, 222, 223, and 224 can be configured to apply Group 1 Rules C. Group 1 Rules C can comprise, e.g., rules to be applied by each of the NEs 221, 222, 223, and 224, optionally including different rules for use by the different NEs 221, 222, 223, and 224.

The same approach can be applied for Groups 2 and 3, albeit with different default group network slice rules. Thus, when processing network communications comprising any of the network slice IDs of Group 2 (network slice IDs 11-20), the RAN 200 NEs 201, 202, 203, and 204 can be configured to apply Group 2 Rules A. Group 2 Rules A can comprise, e.g., rules to be applied by each of the NEs 201, 202, 203, and 204, optionally including different rules for use by the different NEs 201, 202, 203, and 204. Similarly, when processing network communications comprising any of the network slice IDs of Group 2 (network slice IDs 11-20), the transport 210 NEs 211, 212, 213, and 214 can be configured to apply Group 2 Rules B. Group 2 Rules B can comprise, e.g., rules to be applied by each of the NEs 211, 212, 213, and 214, optionally including different rules for use by the different NEs 211, 212, 213, and 214. Also similarly, when processing network communications comprising any of the network slice IDs of Group 2 (network slice IDs 11-20), the core 220 NEs 221, 222, 223, and 224 can be configured to apply Group 2 Rules C. Group 2 Rules C can comprise, e.g., rules to be applied by each of the NEs 221, 222, 223, and 224, optionally including different rules for use by the different NEs 221, 222, 223, and 224.

With regard to Group 3, when processing network communications comprising any of the network slice IDs of Group 3 (network slice IDs 21-30), the RAN 200 NEs 201, 202, 203, and 204 can be configured to apply Group 3 Rules A. Group 3 Rules A can comprise, e.g., rules to be applied by each of the NEs 201, 202, 203, and 204, optionally including different rules for use by the different NEs 201, 202, 203, and 204. Similarly, when processing network communications comprising any of the network slice IDs of Group 3 (network slice IDs 21-30), the transport 210 NEs 211, 212, 213, and 214 can be configured to apply Group 3 Rules B. Group 3 Rules B can comprise, e.g., rules to be applied by each of the NEs 211, 212, 213, and 214, optionally including different rules for use by the different NEs 211, 212, 213, and 214. Also similarly, when processing network communications comprising any of the network slice IDs of Group 3 (network slice IDs 21-30), the core 220 NEs 221, 222, 223, and 224 can be configured to apply Group 3 Rules C. Group 3 Rules C can comprise, e.g., rules to be applied by each of the NEs 221, 222, 223, and 224, optionally including different rules for use by the different NEs 221, 222, 223, and 224.

One advantage of pre-configuring the various NEs to use default processing for different groups of network slice IDs is that it streamlines setup of new network slice IDs within the cellular communications network. For example, consider setup of a new network slice ID 5. Network slice ID 5 is in Group 1. All of the various NEs of the RAN 200, transport 210 and core 220 are preconfigured to process network communications including network slice ID 5 according to default Group 1 network slice rules, namely, Group 1 Rules A, Group 1 Rules B, or Group 1 Rules C. Any of the NEs can be customized/differentiated to use rules other than the default Group 1 network slice rules, however, the remaining undifferentiated NEs of the RAN 200, transport 210 and core 220 need not be specifically configured and can be allowed to operate according to the default Group 1 network slice rules.

Group network slice rules for different groups, such as Group 1, Group 2, and Group 3, can be arranged to meet typical requirements of different scenarios in which network slices are used. It is observed that some customers may use network slices primarily to customize handling of network communications within the core 220, while other customers may use network slices primarily to customize handling of network communications within the RAN 220. The default group network slice rules, e.g., the rules associated with Group 1, Group 2, and Group 3 can therefore optionally be configured to accommodate these different scenarios in some embodiments. However, it will be appreciated that group network slice rules can be devised for any desired scenario without departing from the spirit of this disclosure.

One aspect of configuring an NE, e.g., NE 201, to process network communications comprising a given network slice ID, is to notify various other NEs of the RAN 200, transport 210, and/or core 220 that the NE 201 has been configured to process the given network slice ID. In an aspect of this disclosure, an NE 201 can be configured to notify the various other NEs using a group notification, rather individual notifications for each network slice ID in a group of network slice IDs. Thus, for example, NE 201 can be configured to use consolidated notifications, which include some or all of network slice IDs 1-10, in order to notify the other NEs of the RAN 200, transport 210, and/or core 220 that the NE 201 has been configured to process the group of network slice IDs 1-10.

FIG. 3 illustrates various example network equipment of a cellular communications network that can be configured to process network communications comprising network slice IDs, in accordance with various aspects and embodiments of the subject disclosure. FIG. 3 includes a UE 301, a 5G standalone (SA) RAN 302, a transport 303, and a 5G core network slice 310. The 5G core network slice 310 comprises a network slice selection function (NSSF) 311, a unified data management (UDM) 312, an access and mobility management function (AMF) 313, a session management function (SMF) 314, a network repository function (NRF) 315, and a policy control function (PCF) 316. An example network communication 351, such as a packet, originates at the UE 301 and is processed by network equipment at the 5G SA RAN 302, transport 303, and 5G core network slice 310. The network communication 351 includes a network slice ID (NSID), such as the example ID value 12345. The network equipment can be configured to process the network communication 351 according to network slice rules applicable to the network slice ID 12345, or according to network slice rules applicable to a group of network slice IDs to which the network slice ID 12345 belongs.

Without the benefit of the technologies described herein, 5G network slicing as defined in the 3GPP specifications requires that, before a network slice ID can be used, the network each slice ID must be individually configured in each network element/network equipment and also configured for each RAN node for each cell. This is costly from an engineering and operations perspective and increases the time to market when a large number of network slice IDs are assigned to different customers and users. Furthermore, without the benefit of the technologies described herein, the need to individually configure network equipment is independent of whether any specific network equipment needs to apply differentiated treatment for a network slice ID based on its own functionality.

Embodiments of this disclosure address the above described engineering and operations costs by allowing pre-configuration of groups of network slice IDs. Network slice IDs can then be selected from an appropriate group for further configuration based on any specific customer needs, and any network equipment that is to provide differentiated treatment (different from the group default treatment) for a selected network slice ID can be appropriately configured. This facilitates the efficient deployment of network slice IDs to customers.

Referring now to FIG. 3, the 5G SA RAN 302 can be configured for example by identifying network slice IDs that each RAN node supports, configuring mapping information that maps RAN cells and tracking areas to supported network slices, and assigning an AMF address per network slice ID. If desired, a RAN resource allocation can be assigned per network slice ID and per sector/band, uplink vs. downlink, etc. A different quality of service (QoS) profile can be assigned per network slice ID, and network slice to VLAN/ transport mapping can be configured. The transport 303 can be configured for example by segmenting transport resources per virtual local area network (VLAN).

At the 5G core network slice 310, if needed, the NSSF 311 can be configured with slice to AMF mapping information. The UDM 312 can be provisioned with slice to subscriber mapping information. The AMF 313, SMF 314, and optionally other network equipment can be configured by identifying their supported network slice IDs. If needed, the PCF 316 and other network equipment such as a unified data repository (UDR) can be configured with slice specific policy rules. The NSSF 311, NRF 315, and AMF 313 can be configured with SMF 314 selection information for each network slice ID.

After network equipment is configured to support groups of network slice IDs, according to the example configuration operations described above or otherwise, individual network equipment elements can be configured with additional information, e.g., network equipment can optionally be configured to apply specific and differentiated treatment for network traffic including specific network slice IDs.

Figure 4:
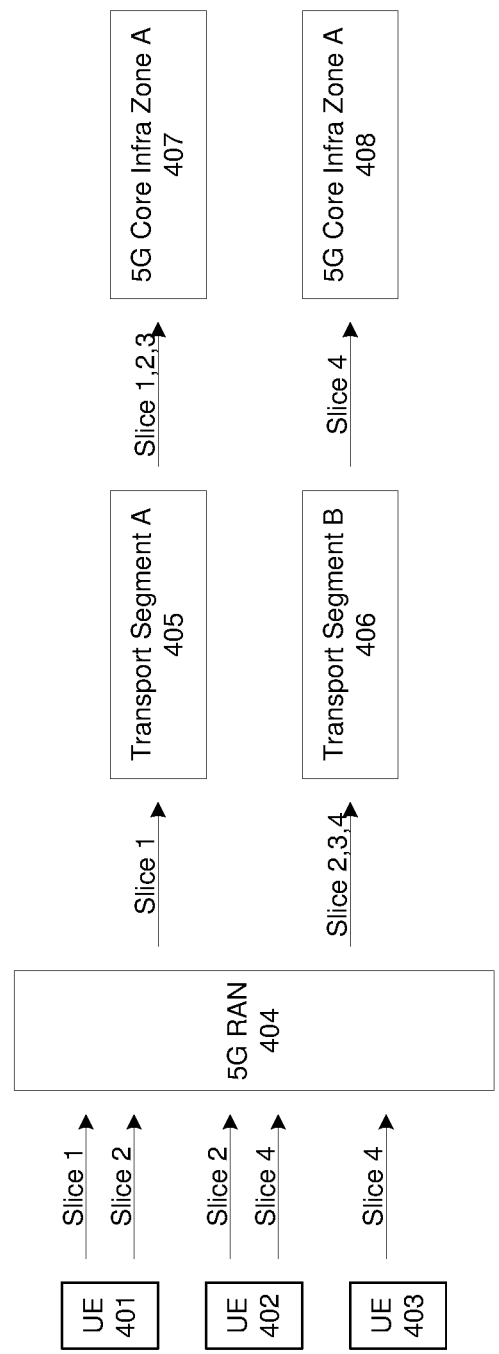
FIG. 4 illustrates example functional differentiation for network slice identifiers in different network equipment, in accordance with various aspects and embodiments of the subject disclosure.

FIG. 4 illustrates example functional differentiation for network slice IDs in different network equipment, in accordance with various aspects and embodiments of the subject disclosure. FIG. 4 includes UEs 401, 402, and 403, a 5G RAN 404, a transport segment A 405, a transport segment B 406, a 5G core infrastructure zone A 407, and a 5G core infrastructure zone B 408.

In FIG. 4, the UE 401 sends network communications comprising slice 1 and slice 2 communications to the 5G RAN 404, the UE 402 sends network communications comprising slice 2 and slice 3 communications to the 5G RAN 404, and the UE 403 sends network communications comprising slice 4 communications to the 5G RAN 404. The 5G RAN 404 sends slice 1 communications to the transport segment A 405, and the 5G RAN 404 sends slice 2, 3, and 4 communications to the transport segment B 406. The transport segments A and B 405, 406 send slice 1, 2 and 3 communications to the 5G core infrastructure zone A 407, and the transport segments A and B 405, 406 send slice 4 communications to the 5G core infrastructure zone B 408.

The 5G RAN 404 can apply differentiated treatment for example by using network slice IDs to determine if a RAN tracking area supports a network slice ID, and to select an AMF. If needed, the 5G RAN 404 can apply differentiated treatment for example through prioritized resource allocations and/or different QoS profiles. The 5G RAN 404 can also map network slice IDs to different transport VLANs, such as transport segment A 405 or transport segment B 406. If needed, different network slice IDs can be pointed to different core infrastructure, e.g., 5G core infrastructure zone A 407 or 5G core infrastructure zone B 408, and the applicable core infrastructure can also be differentiated by applying different policy rules to different network slice IDs.

In some further examples of network equipment differentiated treatment per network slice ID, in the 5G SA RAN 404, resource segmentation can be applied per network slice ID. For example, certain RAN resources can be assigned in a prioritized or dedicated manner to certain network slice ID traffic. Furthermore, different QoS profiles can be applied to different given network slice ID traffic. For example, a different packet forwarding priority value can be applied to a different QoS 5QI (5G QoS Indicator) value. Also, different network slice ID traffic can be pointed to different transport network segments, e.g., to different VLANs.

In the 5G core, different network slice ID traffic can be pointed to different core infrastructures 407, 408, such as to different SMFs (see FIG. 3) and user plane functions (UPFs). Furthermore, different policy rules can be applied to different network slice ID traffics.

It is emphasized that the various example network equipment configuration operations described herein provide some example operations only. Network equipment can be configured to process network communications associated with different network slice IDs in many different ways, and this disclosure is not limited to any specific network equipment configuration operations.

Notably, not every network slice ID requires differentiated treatment in each network equipment. For example, if we want to apply a different policy in the core network for a given network slice ID, but no other differentiation, e.g., no differentiation in the RAN or core network routing functions, then there can be little or no functional benefit to setting up the given network slice ID in network equipment other than the policy engine. RAN or core network routing functions can remain set up according to default configurations. Conversely, if we want to apply, for example, a differentiated QoS profile in the RAN for a given network slice ID, but no other differentiation, then there can be little or no functional benefit to setting up individual network slice ID configurations in network equipment other than the network equipment that provides RAN QoS profile configuration. RAN resource segmentation, core network routing functions, and the core network policy engine can remain set up according to default configurations.

If a small number of network slice IDs are used in a network, then the additional burden to configure each network equipment for each network slice ID is overhead but not especially burdensome. However, a large number of 5G network slice IDs is likely in some networks, e.g., one per enterprise that wants their own network slice ID due to some specific desired differentiation. This could result in hundreds or thousands of network slice IDs. This becomes a significant operational overhead and cost, resulting in time to market delays. The techniques described herein are therefore particularly advantageous for networks that anticipate using large numbers of network slice IDs.

In an aspect, techniques described herein can simplify implementation of large numbers of network slices by reducing operational costs, while also delivering fast time to market of network slices. Embodiments can provide an ability to pre-configure network slice ID ranges as well as wild carding related to which network equipment, such as which RAN nodes and which cell, support which network slice IDs. Wild carding is described further in connection with FIG. 5. Embodiments can optionally furthermore provide an ability for network equipment to use more specific and less-specific prioritized network slice rule configurations, as well as includes exclusion configurations. Embodiments can optionally furthermore use network slice ID ranges and wildcarding for configuring which network equipment can apply differentiated treatment for network slice ID traffic in their respective functionalities.

Embodiments can optionally furthermore provide an ability for RAN and core nodes to use more specific/less-specific prioritized matching rule configurations in their respective functionalities/behaviors when a specific network slice ID based session traffic is processed. In the RAN, embodiments can facilitate whether to apply differentiation and which differentiation (e.g., resource segmentation vs. QoS profile). In the core, embodiments can provide an ability to apply network slice ID based network equipment selection, or apply different policy rules. This includes exclusion configurations.

Some embodiments can pre-configure network equipment using pre-defined ranges and wild cards, before individual network slice IDs are assigned to a customer, or to an application traffic or application traffic group, or a combination of customers/applications. The pre-defined ranges and network slice ID numbering plan can be planned such that, when a specific network slice ID is assigned to a customer and/or an application, then the network equipment that applies differentiated treatment for that specific network slice ID can be configured. All other network equipment and functionalities can avoid additional configuration for specific network slice IDs, unless such additional configuration is specifically desired.

FIG. 5 illustrates an example of a network slice ID pre-configuration number plan, in accordance with various aspects and embodiments of the subject disclosure. In FIG. 5, network slice IDs are composed of slice type (SST) and slice differentiator (SD) values, which are in the left side columns. SSTs 1-4, with null SD values, are shown in the top rows of the number plan and are reserved for various default purposes that are not specifically related to this disclosure. Example SST 128 is associated with multiple different groups of SD values, namely, a first group comprising SD values 1-10,000, a second group comprising SD values 10,001-20,000, a third group comprising SD values 20,001-30,000, and a fourth group comprising SD values 30,001-40,000. These example groups are defined by ranges of SD values associated with SST 128; however, it will be appreciated that other approaches to defining groups of network slice IDs are possible. These example groups of network slice IDs can be used for the purposes of this disclosure, e.g., the network slice IDs can be pre-configured to serve commonly used scenarios for which network slice IDs are deployed.

In FIG. 5, the example purpose of the first group of network slice IDs, comprising SST value 128 and SD values 1-10,000 is, to provide preconfigured network slice IDs for enterprises that want network slices for which slice level impact is limited to core policy rules. In other words, custom core policy rules are desired, however little or no other core configuration or RAN configuration is expected to be needed. Group network slice rules for the first group can employ default core network and RAN network slice processing rules that accommodate core policy rule customization. As stated in FIG. 5, no RAN or NSSF, AMF or NRF configuration is expected to be needed, only preconfigured behaviors of those elements is expected. That said, any specific network equipment can be configured in a customized fashion if desired.

In FIG. 5, the example purpose of the second group of network slice IDs, comprising SST value 128 and SD values 10,001-20,000 is, to provide preconfigured network slice IDs for enterprises that want a dedicated core network per network slice ID. In other words, dedicated core network functions are desired, however little or no RAN configuration is expected to be needed. Group network slice rules for the first group can employ default RAN network slice processing rules that accommodate dedicated core network functions, as well as default core processing rules that accommodate dedicated core network functions. As stated in FIG. 5, if RAN differentiated treatment is desired for any individual network slice ID within this second group of network slice IDs, or for sub-groups/sub-ranges of network slice IDs within the second group, then a more specific match rule, namely, a more specific network slice rule, can be implemented to provide differentiated RAN treatment.

The example purpose of the third group comprising SD values 20,001-30,000 is, to provide preconfigured network slice IDs for RAN resource segmentation in certain locations (e.g., factories and venues). To accomplish this, custom RAN functions are desired, however little or no core configuration is expected to be needed. Group network slice rules for the third group can employ default core network slice processing rules that accommodate RAN customization, as well as default RAN processing rules that accommodate RAN customization and in particular, location based RAN resource segmentation.

The example purpose of the fourth group comprising SD values 30,001-30,000 is, to provide preconfigured network slice IDs to support RAN custom QoS characteristics. To accomplish this, custom RAN functions are desired, however little or no core configuration is expected to be needed. Group network slice rules for the third group can employ default core network slice processing rules that accommodate RAN customization, as well as default RAN processing rules that accommodate RAN customization and in particular, custom RAN QoS characteristics.

Pursuant to the illustrated approach, individual per network slice ID based network equipment configurations can be applied when needed for an individual network slice ID, at the network equipment (e.g., RAN vs. NRF/NSSF vs. PCF) that is impacted, and at the specific sub-function that is impacted. However, individual slice ID configuration of network equipment is not needed for network equipment that can be allowed to use default group network slice rules. The ability to avoid configuration of at least some network equipment provides efficiency gains in deploying network slice IDs.

In some embodiments, network slice ID based ranges and/or wild carding (*) can be pre-configured in the network elements. SST 129 and SST 130 in FIG. 5 include a wildcard (*) value in the SD column. For SST 129 and SST 130, the wildcard can cause network equipment to override any individual or group network processing rules associated with network slice IDs or groups of network slice IDs. A wildcard network slice rule can apply regardless of other rules. Also, cell information for each cell of the RAN can be preconfigured by identifying which network slice IDs are supported by which cell. For example, RAN QoS profile settings vs. RAN resource segmentation may have different configuration methods, and the impacted sub-function can have the per slice-ID level configuration.

Combination handlings can also be supported, and different combinations are possible. In these cases, individual entry or sub-range based configurations can be implemented in the impacted node, and need not be implemented in other nodes. For example, when an enterprise wants a custom QoS profile and also wants a core network policy rule, embodiments can still avoid configuration of other network equipment, and only add the policy rule entry in the PCF. The note 1 in FIG. 5 is, if additional core configurations are needed, then per slice ID based more specific match rule configurations can be implemented in the core.

In the illustrated approach, RAN and core nodes can use more specific/less-specific prioritized configurations in their respective functionalities/behaviors when a specific network slice ID based session traffic is processed, enabling handling of combination scenarios. More specific to less specific match rules can also include exclusions. For example, all cells can be pre-marked with a ranges or wild cards (e.g., all *:* SST:SD values). In another example, all cells can be marked to support all network slice IDs, or for the network slice ID ranges specified. Afterwards, individual network slice IDs or more specific sub-ranges of slice IDs can be added, in relevant Cell information for the network slice IDs that are not supported. If a network slice ID is not supported for a given Cell, or RAN or Core node, then a more specific exclusion rule can be matched. Else, the less specific range or wild card rule match can apply.

Figure 6:
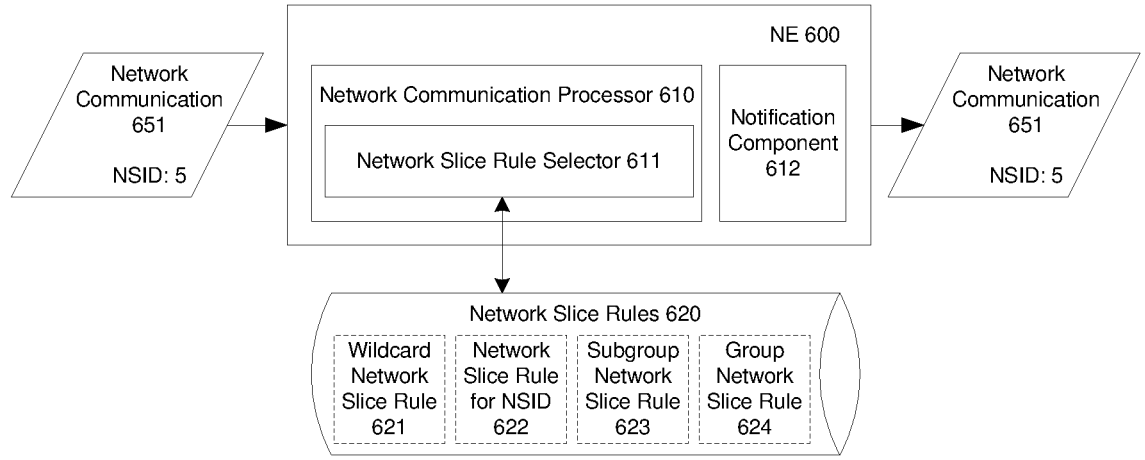
FIG. 6 illustrates example network equipment, in accordance with various aspects and embodiments of the subject disclosure.

FIG. 6 illustrates example network equipment, in accordance with various aspects and embodiments of the subject disclosure. FIG. 6 comprises example network equipment (NE) 600. Network equipment 600 comprises a network communication processor 610 which includes a network slice rule selector 611. Network equipment 600 also comprises a notification component 612.

Network equipment 600 can furthermore comprise or otherwise access network slice rules 620. Network slice rules 620 can optionally include, e.g., a network slice rule for NSID 622, which is an example of a network slice rule that applies only to a specific network slice ID. Network slice rules 620 can also optionally include, e.g., a group network slice rule 624, which is an example of a network slice rule that applies to a group of network slice IDs. Network slice rules 620 can also optionally include, e.g., a subgroup network slice rule 623, which is an example of a network slice rule that applies to a subgroup of network slice IDs. Network slice rules 620 can also optionally include, e.g., a wildcard slice rule 621, which is an example of a network slice rule that applies to every network slice ID, regardless of group or individual network slice ID value. In an embodiment, wildcards can be per-SST value, e.g., the wildcard applies only to network slice IDs comprising SST 129.

FIG. 6 illustrates arrival of a network communication 651 at the network equipment 600. The network communication 651 comprises an example network slice ID with a value of 5. In response to receiving the network communication 651 for processing, the network equipment 600 can use network slice rule selector 611 to select an appropriate network slice rule to use in connection with processing the network communication 651. The network slice rule selector 611 can use the network slice ID, e.g., 5, to select an appropriate network slice rule from network slice rules 620.

The network slice rule selector 611 can be configured to select an appropriate network slice rule using a specificity-based approach, wherein higher specificity network slice rules have priority over lower specificity rules. Thus, if a network slice rule for NSID 622 exists which applies to NSID 5, then the network slice rule selector 611 can select the network slice rule for NSID 622 to use in connection with processing the network communication 651. If no network slice rule for NSID 622 exists which applies to NSID 5, then the network slice rule selector 611 can determine whether a subgroup network slice rule 623 exists which applies to NSID 5. If so, then the network slice rule selector 611 can select subgroup network slice rule 623 to use in connection with processing the network communication 651. If no applicable network slice rule for NSID 622 or subgroup network slice rule 623 exists for NSID 5, then the network slice rule selector 611 can select the group network slice rule 624 to use in connection with processing the network communication 651.

The wildcard network slice rule 621, if present in network slice rules 620, can optionally preempt selection of other network slice rules. Thus, if a wildcard network slice rule 621 applicable to NSID 5 is present in network slice rules 620, the network slice rule selector 611 can select the wildcard network slice rule 621 regardless of the presence of other rules in the network slice rules 620.

The notification component 612 can be configured to notify other network equipment regarding network slice IDs, and groups of network slice IDs, that are supported by the network equipment 600. Thus, for example, when a network slice rule for a new network slice ID is configured in network slice rules 620, the notification component 612 can notify other network equipment that the new network slice ID is supported by the NE 600. When a network slice rule for a new group of network slice IDs is configured in network slice rules 620, the notification component 612 can optionally use a consolidated notification to notify other network equipment that multiple network slice IDs of the new group of network slice IDs are supported by the network equipment 600.

Figure 7:
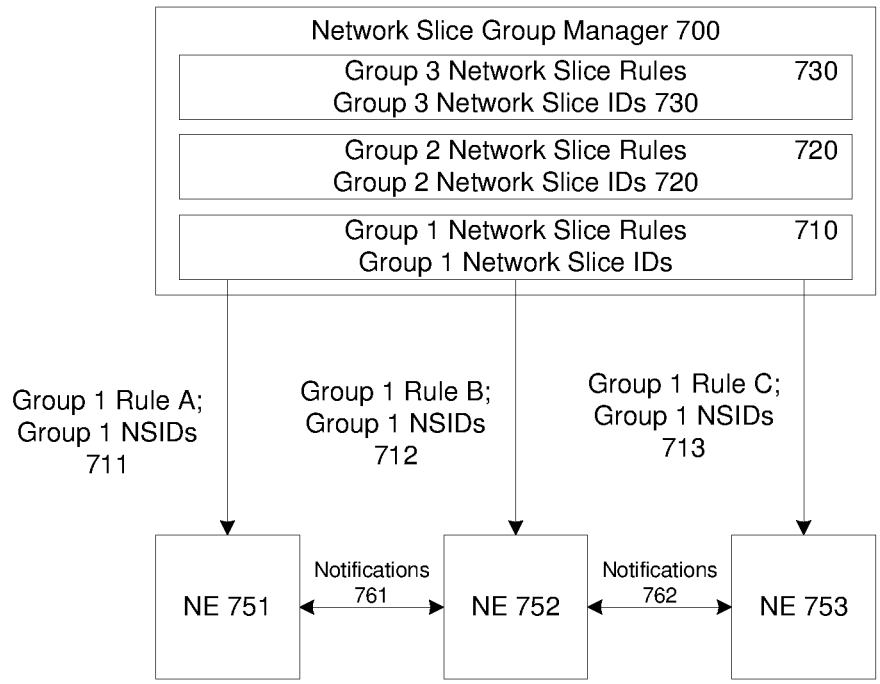
FIG. 7 illustrates example deployment of groups of network slice identifiers, as well as group network slice rules, to network equipment, in accordance with various aspects and embodiments of the subject disclosure.

FIG. 7 illustrates example deployment of groups of network slice IDs as well as group network slice rules to network equipment, in accordance with various aspects and embodiments of the subject disclosure. FIG. 7 includes an example network slice group manager 700 and example network equipment including NE 751, NE 752, and NE 753. The network slice group manager 700 deploys groups of network slice IDs as well as corresponding group network slice rules to the various NEs 751, 752, 753.

The network slice group manager 700 is illustrated as comprising three groups of network slice rules, each group of network slice rules having a corresponding group of network slice IDs. Group 1 network slice rules correspond to Group 1 network slice IDs of block 710. Group 2 network slice rules correspond to Group 2 network slice IDs of block 720. Group 3 network slice rules correspond to Group 3 network slice IDs of block 730. In FIG. 7, the network slice group manager 700 deploys the Group 1 network slice rules and corresponding network slice IDs of block 710 to the NEs 751, 752, 753.

A first rule, Group 1 rule A, of the Group 1 network slice rules is deployed to NE 751, along with the Group 1 network slice IDs to which the Group 1 rule A can be applied. A second rule, Group 1 rule B, of the Group 1 network slice rules is deployed to NE 752, along with the Group 1 network slice IDs to which the Group 1 rule B can be applied. A third rule, Group 1 rule C, of the Group 1 network slice rules is deployed to NE 753, along with the Group network slice IDs to which the Group 1 rule C can be applied. Each of the NEs 751, 752, 753 can send notifications, e.g., notifications 761, 762, to the other NEs 751, 752, 753, to notify the other NEs 751, 752, 753 when an NE is configured to support the Group 1 network slice IDs.

If there are conflicting configurations, e.g., overlapping range pre-configurations, then, either a configuration tool at network slice group manager 700 can warn and reject conflicting configuration requests, or a most recently entered configuration rule number can take precedence over an earlier rule that is conflicting.

Figure 8:
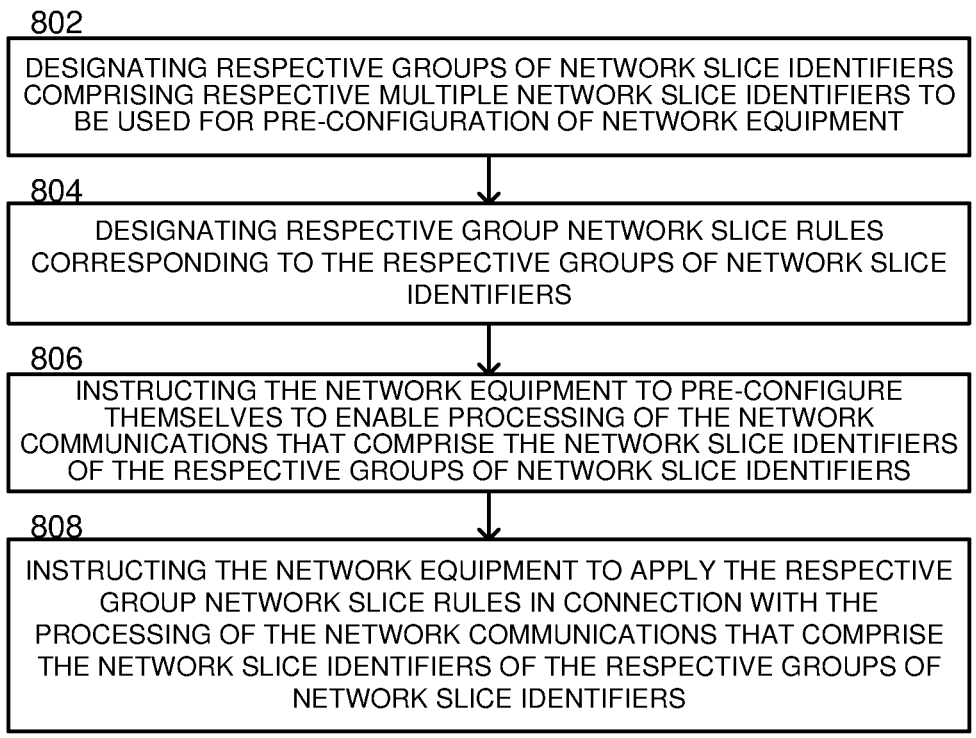
FIG. 8 is a flow diagram representing example operations of a network slice group manager in connection with configuring network equipment to process groups of network slice identifiers, in accordance with various aspects and embodiments of the subject disclosure.

FIG. 8 is a flow diagram representing example operations of a network slice group manager in connection with configuring network equipment to process groups of network slice IDs, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 8 can be performed, for example, by a network slice group manager such as network slice group manager 700 illustrated in FIG. 7. Example operation 802 comprises designating respective groups of network slice IDs comprising respective multiple network slice IDs to be used for pre-configuration of network equipment. For example, with reference to FIG. 7, the network slice IDs for blocks 710, 720, and 730 can be designated. In an embodiment, the respective groups of network slice IDs for blocks 710, 720, and 730 can be designated by respective slice differentiator value ranges, such as the SD ranges illustrated in FIG. 5.

In some embodiments, at least one of the respective groups of network slice IDs can be designated for network slices associated with core network customization and not associated with access network (RAN) customization. Furthermore, at least one of the respective groups of network slice IDs can be designated for network slices associated with access network (RAN) customization and not associated with core network customization. For example, block 710 can be designated for network slices likely to include core network customization, while blocks 720 and 730 can be designated for network slices likely to include different types of access network customization. As described herein, group defaults do not require that any particular network slice/network slice ID use the defaults, however, the defaults provide useful operational efficiencies for network slices/network slice IDs that do use the defaults.

Example operation 804 comprises designating respective group network slice rules corresponding to the respective groups of network slice IDs (designated at block 802), wherein the respective group network slice rules are for application by the network equipment in connection with processing network communications that comprise network slice IDs of the respective groups of network slice IDs. For example, with reference to FIG. 7, the network slice rules for blocks 710, 720, and 730 can be designated. The network slice rules can include rules for NE 751, 752, and 753. The network slice rules can be configured to serve the purposes for which corresponding groups of network slice IDs were designated, as described in connection with FIG. 5.

Example operation 806 comprises instructing the network equipment to pre-configure themselves to enable processing of the network communications that comprise the network slice IDs of the respective groups of network slice IDs. For example, group network slice rules and corresponding groups of network slice IDs can be sent to each of the NEs 751, 752, 753 illustrated in FIG. 7. The NEs 751, 752, 753 can be configured to configure themselves to process network slice IDs included in the group according to the group network slice rules.

Example operation 808 comprises instructing the network equipment to apply the respective group network slice rules in connection with the processing of the network communications that comprise the network slice IDs of the respective groups of network slice IDs. This operation can optionally be combined with operation 806 in some embodiments. Group network slice rules can be sent to NEs 751, 752, 753 either independently of corresponding groups of network slice IDs, or separately.

Figure 9:
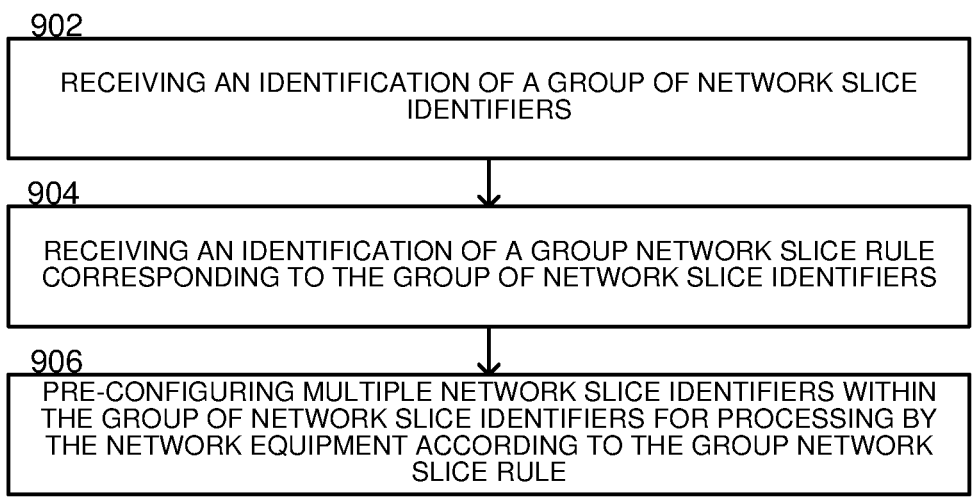
FIG. 9 is a flow diagram representing example operations of a network equipment in connection with establishing configuration to process network identifiers included in groups of network slice identifiers, in accordance with various aspects and embodiments of the subject disclosure.

FIG. 9 is a flow diagram representing example operations of network equipment in connection with establishing configuration to process network IDs included in groups of network slice IDs, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 9 can be performed, for example, by network equipment such as NEs 751, 752, 753, illustrated in FIG. 7. Example operation 902 comprises receiving an identification of a group of network slice IDs. For example, NE 751 can receive Group 1 network slice IDs as illustrated in FIG. 7. In some embodiments, such as illustrated in FIG. 5, the identification of the group of network slice IDs can comprise an identification of a slice type (SST) value and an identification of a range of slice differentiator (SD) values. In some embodiments, the identification of the group of network slice IDs can comprises a group definition, wherein a range is just one example of a group definition, and appreciating that other group definitions such as even values, odd values, or any other group definition can be used. The group definition can optionally specify exclusions from the group definition. An exclusion can exclude one or more network slice IDs from the group of network slice IDs.

Different groups of network slice IDs can be established for different purposes, and the corresponding group network slice rules can be created to serve these purposes. As previously described herein, a group of network slice IDs can be designated to comprise network slice IDs for which custom access network configurations are not implicated. In other words, network slice IDs for which core network customizations are generally expected, understanding that each network slice can be customized to any desired degree if desired.

Another group of network slice IDs can be designated to comprise network slice IDs for which custom core network configurations are not implicated. In other words, network slice IDs for which RAN customizations are generally expected.

Another group of network slice IDs can be designated to comprise network slice IDs associated with access network (RAN) resource segmentation. In other words, RAN network equipment associated with resource segmentation is expected to be provided with differential treatment rules, while other network equipment of the RAN and network equipment of the core network are more likely to remain set according to group network slice rules.

Another group of network slice IDs can be designated to comprise network slice IDs associated with access network (RAN) quality of service (QoS) differentiation. In other words, RAN network equipment associated with QoS is expected to be provided with differential treatment rules, while other network equipment of the RAN and network equipment of the core network are more likely to remain set according to group network slice rules.

Example operation 904 comprises receiving an identification of a group network slice rule corresponding to the group of network slice IDs received at block 902. For example, NE 751 can receive Group 1 rule A as illustrated in FIG. 7. Example operation 906 comprises pre-configuring multiple network slice IDs, an optionally all of the network slice IDs, within the group of network slice IDs (received at block 902) for processing by the network equipment 700 according to the group network slice rule received at block 904. As a result of the pre-configuring, unless a different network slice rule other than the group network slice rule is determined to take priority over the group network slice rule, the network equipment 700 can be pre-configured to process network communications comprising any of the multiple network slice IDs received at block 902 according to the group network slice rule received at block 904.

In some embodiments, operations according to FIG. 9 can comprise receiving identifications of multiple groups of network slice IDs, e.g., at block 902, and corresponding group network slice rules, e.g., at block 904. One or more of the multiple group network slice rules, e.g., a first one of the corresponding group network slice rules comprising a wildcard rule such as described herein, can apply to multiple network slice IDs regardless of whether another group network slice rule, e.g., a second network slice rule, is associated with any of the multiple network slice IDs.

Figure 10:
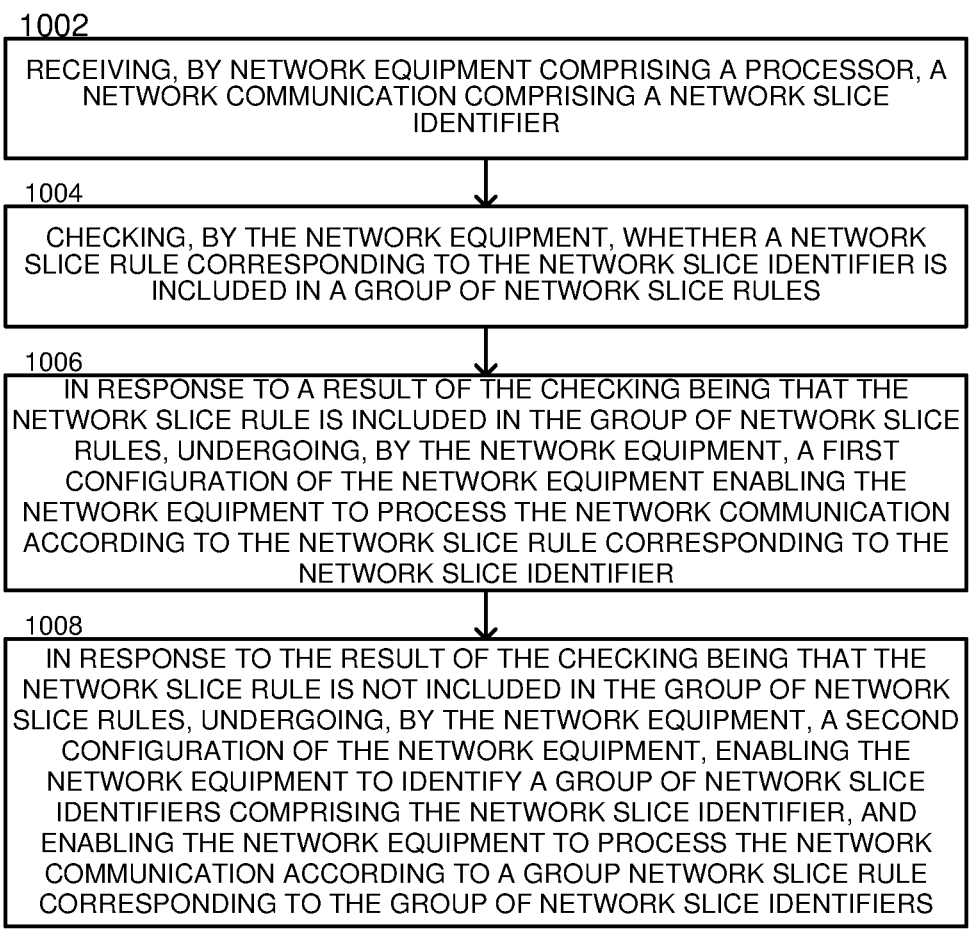
FIG. 10 is a flow diagram representing example operations of a network equipment in connection with processing a network communication containing a network slice identifier included within a group of network slice identifiers, in accordance with various aspects and embodiments of the subject disclosure.

FIG. 10 is a flow diagram representing example operations of a network equipment in connection with processing a network communication containing a network slice ID included within a group of network slice IDs, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 10 can be performed, for example, by network equipment such as NE 600, illustrated in FIG. 6. Example operation 1002 comprises receiving, by network equipment 600 comprising a processor, a network communication 651 comprising a network slice ID (NSID). Example operation 1004 comprises checking, by the network equipment 600 whether a network slice rule of network slice rules 620 corresponding to the network slice ID (NSID) is included in a group of network slice rules 620. For example, at operation 1004, the network equipment 600 can check for a network slice rule for NSID 622 that corresponds specifically to the network slice ID included in the network communication 651.

At operation 1006, in response to a result of the checking being that the network slice rule 622 is included in the group of network slice rules 620, the network equipment 600 can undergo a first configuration of the network equipment 600 enabling the network equipment 600 to process the network communication 651 according to the network slice rule 622 corresponding to the network slice ID included in the network communication 651.

At operation 1008, in response to the result of the checking being that the network slice rule 622 is not included in the group of network slice rules 620, the network equipment 600 can undergo a second configuration of the network equipment 600, enabling the network equipment 600 to identify a group of network slice IDs comprising the network slice ID (NSID of the network communication 651), and enabling the network equipment 600 to process the network communication 651 according to a group network slice rule 624 corresponding to the group of network slice IDs.

In an embodiment, the slice ID included in the network communication 651 can comprise a slice type value (SST) and a slice differentiator value (SD), and identifying the group of network slice IDs comprising the network slice ID can comprise identifying a range of slice differentiator values comprising the slice differentiator value.

The group network slice rule 624 can be configured in multiple different ways, depending on the function of the network equipment and the purpose of the corresponding group of network slice IDs served by the group network slice rule 624. In some scenarios, the group network slice rule 624 can comprise a default core network rule that applies to multiple other network communications other than the network communication 651. In some scenarios, the group network slice rule 624 can comprise a default access network rule that applies to multiple other network communications other than the network communication 651. The default access network rule can comprise, e.g., a location based access network resource segmentation rule, or a QoS rule.

As described herein, the group of network slice IDs can be defined according to a group definition. Exclusions from the group definition can optionally exclude at least one network slice ID from the group of network slice IDs.

In some embodiments, the checking at block 1004 can further comprise checking whether the network slice ID is included in a subgroup of the group of network slice IDs. In response to the result of the checking being that the network slice ID is included in the subgroup of the group of network slice IDs, the network equipment 600 can undergo a third configuration of the network equipment 600 enabling the network equipment 600 to process the network communication 651 according to a subgroup network slice rule 623 corresponding to the subgroup of the group of network slice IDs.

Figure 11:
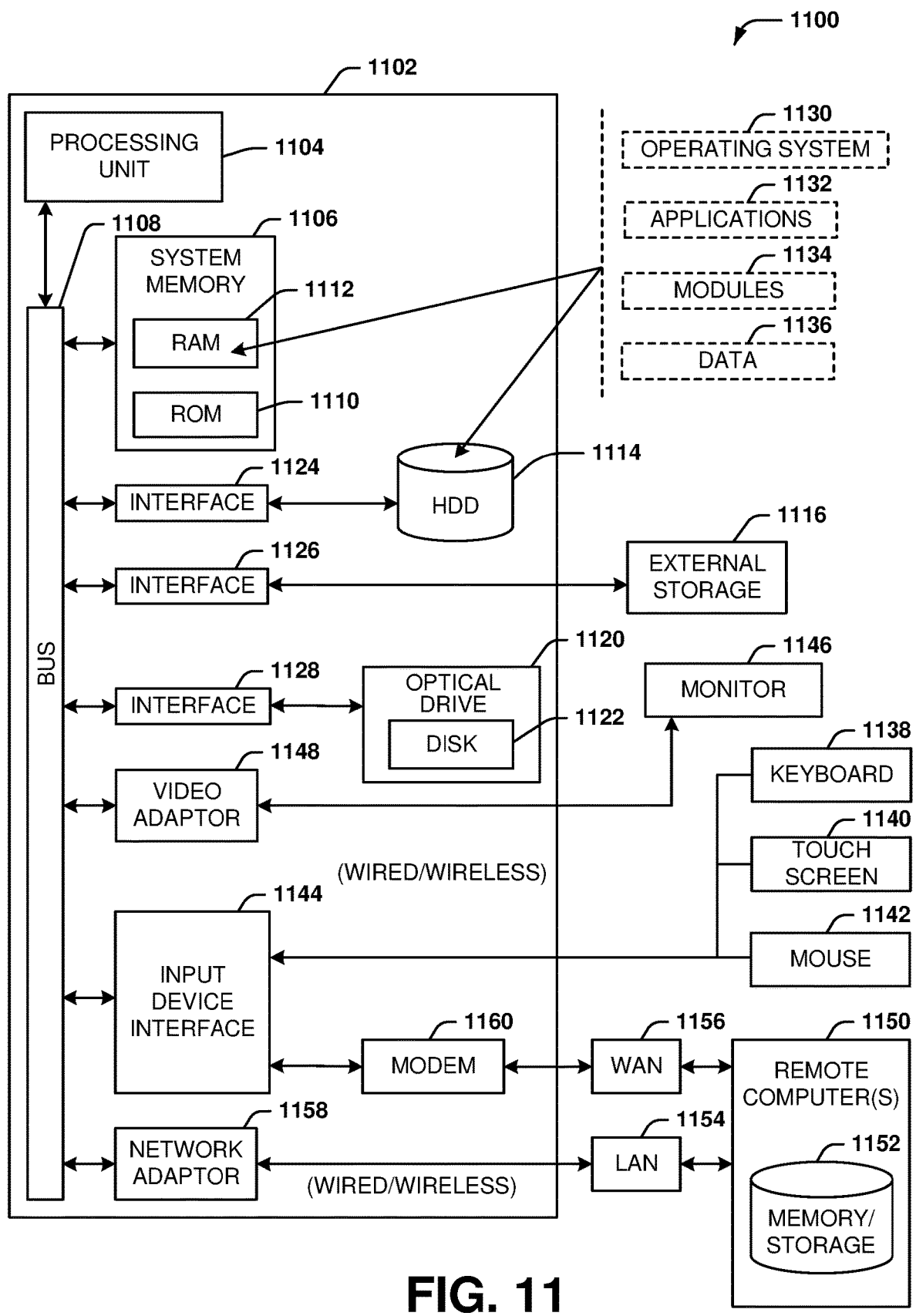
FIG. 11 is a block diagram of an example computer that can be operable to execute processes and methods in accordance with various aspects and embodiments of the subject disclosure.

FIG. 11 is a block diagram of an example computer that can be operable to execute processes and methods in accordance with various aspects and embodiments of the subject disclosure. The example computer can be adapted to implement, for example, any of the various network equipment described herein, or a network slice group manager device, or other computing devices described herein.

FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A first network device, comprising:
   a processing system including a processor; and
   a memory that stores executable instructions that, when executed by the processing system, facilitate performance of operations, the operations comprising:
   obtaining a group of network slice identifiers from a second network device over a communication network;
   identifying a network slice rule associated with each network slice identifier of the group of network slice identifiers resulting in a group of network slice rules;
   receiving first network traffic from a third network device over the communication network and receiving second network traffic from a fourth network device over the communication network;
   determining that the first network traffic is associated with a first network slice identifier from the group of network slice identifiers and determining that the second network traffic is associated with a second network slice identifier from the group of network slice identifiers;
   identifying a first network slice rule from the group of network slice rules based on the first network slice identifier and identifying a second network slice rule from the group of network slice rules based on the second network slice identifier; and
   configuring a first portion of the first network device based on the first network slice rule and configuring a second portion of the first network device based on the second network slice rule.

2. The first network device of claim 1, wherein the first network device is associated with a group of resources.

3. The first network device of claim 2, wherein the group of resources includes at least one of computer processing capacity and bandwidth capacity.

4. The first network device of claim 2, wherein the configuring of the first portion of the first network device comprises allocating a first portion of the group of resources to the first network traffic.

5. The first network device of claim 2, wherein the configuring of the second portion of the first network device comprises allocating a second portion of the group of resources to the second network traffic.

6. The first network device of claim 1, wherein each network slice rule of group of network slice rules is associated with a quality of service.

7. The first network device of claim 1, wherein each network slice identifier of group of network slice identifiers is associated with a quality of service.

8. A non-transitory machine-readable medium, comprising executable instructions that, when executed by first network device including a processor, facilitate performance of operations, the operations comprising:
   obtaining a group of network slice identifiers from a second network device over a communication network;
   determining a quality of service profile associated with each network slice identifier resulting in a group of quality of service profiles;
   identifying a network slice rule associated with each quality of service profile of the group of quality of service profiles resulting in a group of network slice rules;
   receiving first network traffic from a third network device over the communication network and receiving second network traffic from a fourth network device over the communication network;
   determining that the first network traffic is associated with a first network slice identifier from the group of network slice identifiers and determining that the second network traffic is associated with a second network slice identifier from the group of network slice identifiers;
   identifying a first network slice rule from the group of network slice rules based on the first network slice identifier and identifying a second network slice rule from the group of network slice rules based on the second network slice identifier; and
   configuring a first portion of the first network device based on the first network slice rule and configuring a second portion of the first network device based on the second network slice rule.

9. The non-transitory machine-readable medium of claim 8, wherein the first network device is associated with a group of resources.

10. The non-transitory machine-readable medium of claim 9, wherein the group of resources includes at least one of computer processing capacity and bandwidth capacity.

11. The non-transitory machine-readable medium of claim 9, wherein the configuring of the first portion of the first network device comprises allocating a first portion of the group of resources to the first network traffic.

12. The non-transitory machine-readable medium of claim 9, wherein the configuring of the second portion of the first network device comprises allocating a second portion of the group of resources to the second network traffic.

13. The non-transitory machine-readable medium of claim 8, wherein each network slice rule of group of network slice rules is associated with a quality of service.

14. The non-transitory machine-readable medium of claim 8, wherein each network slice identifier of group of network slice identifiers is associated with a quality of service.

15. A method, comprising:
receiving, by a first network device including a processor, first network traffic from a second network device over a communication network and receiving, by the first network device, second network traffic from a third network device over the communication network;
determining, by the first network device, that the first network traffic is associated with a first network slice identifier from a group of network slice identifiers and determining, by the first network device, that the second network traffic is associated with a second network slice identifier from the group of network slice identifiers;
identifying, by the first network device, a first network slice rule from a group of network slice rules based on the first network slice identifier and identifying, by the first network device, a second network slice rule from the group of network slice rules based on the second network slice identifier; and
configuring, by the first network device, a first portion of the first network device based on the first network slice rule and configuring, by the first network device, a second portion of the first network device based on the second network slice rule.

16. The method of claim 15, wherein the first network device is associated with a group of resources.

17. The method of claim 16, wherein the group of resources includes at least one of computer processing capacity and bandwidth capacity.

18. The method of claim 16, wherein the configuring of the first portion of the first network device comprises allocating a first portion of the group of resources to the first network traffic.

19. The method of claim 16, wherein the configuring of the second portion of the first network device comprises allocating a second portion of the group of resources to the second network traffic.

20. The method of claim 15, comprising determining, by the first network device, that the first network slice rule associated with a first quality of service profile and determining, by the first network device, that the second network slice rule associated with a second quality of service profile.

* * * * *